Sept. 20, 1927.                G. D. MORRIS                1,642,886
                              REFRACTORY BODY
                            Filed Dec. 18, 1925
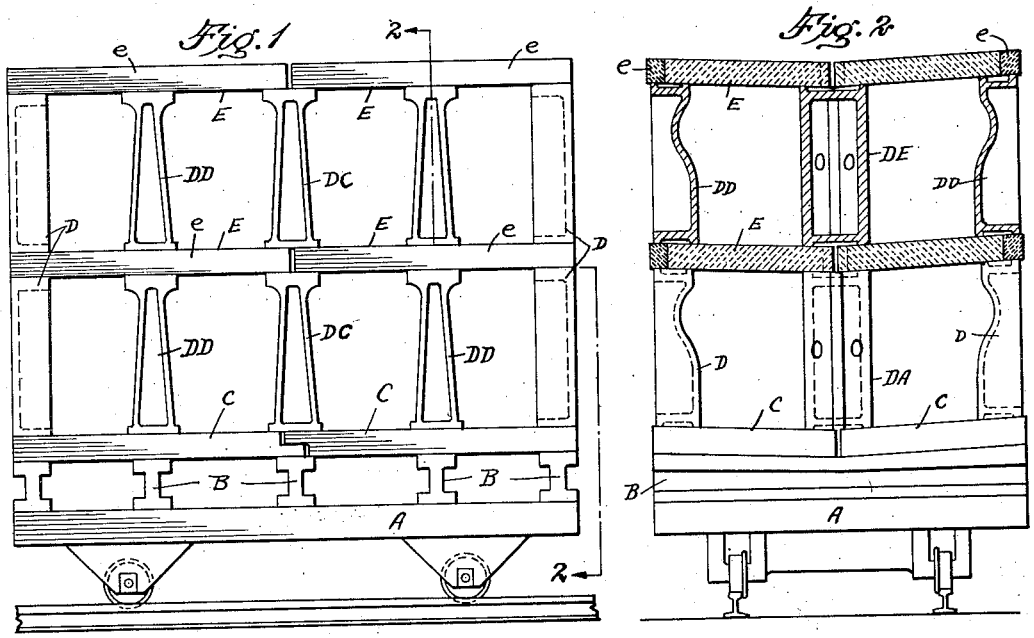
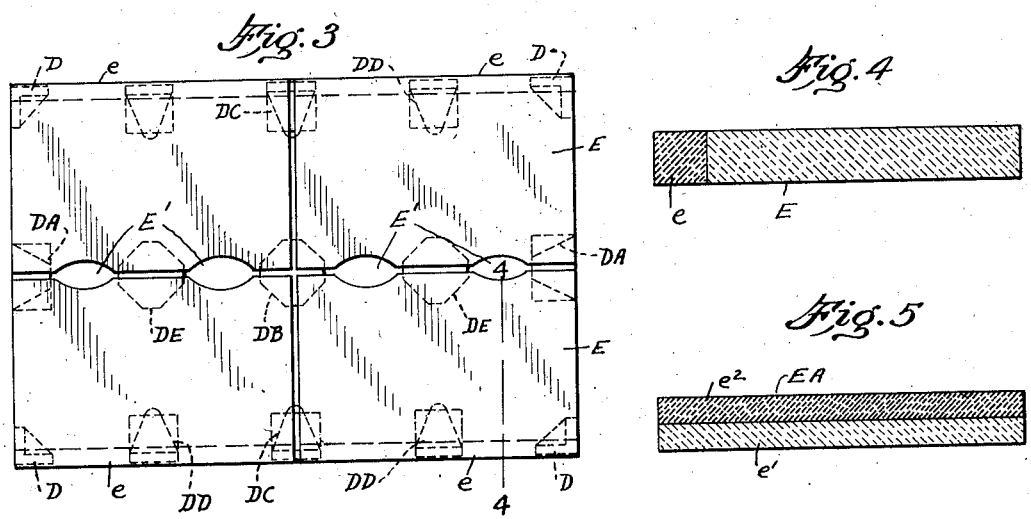
INVENTOR
George D Morris
BY
John E. Hubbell
ATTORNEY Patented Sept. 20, 1927.

1,642,886

UNITED STATES PATENT OFFICE.

GEORGE D. MORRIS, OF NEW CASTLE, PENNSYLVANIA, ASSIGNOR TO NEW CASTLE REFRACTORIES COMPANY, OF NEW CASTLE, PENNSYLVANIA, A CORPORATION OF DELAWARE.

REFRACTORY BODY.

Application filed December 18, 1925. Serial No. 76,275.

The general object of my present invention is to provide improvements in refractory bodies for use in the construction of kilns, tunnel kiln cars, and in general for use wherever refractory bodies are required to withstand high temperatures and to possess considerable mechanical strength. My invention is characterized by the formation of a slab, block, or other refractory body of separate but intimately connected or integral sections of different materials such as fire clay and carborundum or in lieu of the latter, some other highly refractory material such as fused alumina, natural alumina silicates such as sillimanite and cyanite, mullite or zirconium silicate.

With such composite bodies certain important advantages are obtained. In general it is thus possible to obtain in a single body some of the special advantages of each of the materials used in the different sections without disadvantages attending the use or formation of the body wholly out of one only, of the materials employed. For example, it is advantageous in some cases from the standpoint of cost, to make a portion of the body out of a relatively cheap material as fire clay, and to make another portion or portions of the body of more expensive material as carborundum or of some refractory substances still more expensive than carborundum.

Such a composite body may well be substantially cheaper to make than would a body of the same size and dimensions made wholly of the more expensive material, and at the same time the more expensive material may furnish adequate strength or refractory properties to a portion of the body which would not be sufficiently strong or refractory if made of fire clay. Another advantage of such composite body under some conditions arises from the different manner in which the surfaces of bodies formed of the different materials resist surface disintegrating effects. For instance, in enameling sanitary ware the fumes and vapors of the enameling materials on the ware or applied to adjacent refractory parts form blisters on carborundum bodies, but not on fire clay bodies. In consequence it is not possible to locate carborundum bodies above the articles to be enameled because the blisters formed by the fumes break and the blister particles fall on to the ware destroying the surface of the latter. Since it is desirable in the construction of tunnel kilns for enameling sanitary ware and the like, to employ roof slabs for ware receiving chambers in which use is made of the greater strength of carborundum as compared with fire clay, such roof slabs are formed in accordance with the present invention, with portions immediately above the ware made of fire clay and with other portions made of carborundum.

The various features of novelty which characterize my invention are pointed out with particularity to the claims annexed to and forming a part of this specification. For a better understanding of the invention, however, its advantages and specific objects attained with it, reference should be had to the accompanying drawings and descriptive matter in which I have illustrated and described preferred embodiments of my invention.

Of the drawings:

Fig. 1 is a side elevation of a tunnel kiln car;

Fig. 2 is a section on the broken line 2—2 of Fig. 1;

Fig. 3 is a plan view of the car shown in Fig. 1;

Fig. 4 is a section of a slab embodying one form of my invention the section being taken on the line 4—4 of Fig. 3;

Figs. 5 and 6 are views taken similarly to Fig. 4 each illustrating a different modification of the slab construction shown in Fig. 4.

In Figs. 1, 2, and 3 I have illustrated a tunnel kiln car suitable for use in moving sanitary ware through a glost kiln. The car, as shown, comprises a body portion A which may be of usual construction and supports through transverse beams B a lower ware supporting platform C formed of refractory slabs resting on the beams B. Above the platform C are an intermediate and an upper ware supporting platform each formed of slabs E. As shown, the intermediate platform is formed by four slabs E which are similar in shape, each being in the form of a rectangular block cut away at one side as indicated at E', the notches uniting to form a plurality of passages through the platform located at intervals along the center line of the car. Each individual slab is supported at its corners by posts D, DA, DB, and DC. In addition each slab is supported between its ends by a post DE at the center if the car and a post DD at the side of the car. With the particular car construction shown, the platform slabs E are permanently supported by the posts D, DA, DB, DC, and DE, but the posts DD may be removed to facilitate moving the ware treated onto and off the car. The upper platform is composed of slabs E which may be similar to those forming the intermediate platform and are similarly supported by posts D, DA, DB, DC, and DD. In the intended use of the particular car construction illustrated in enameling sanitary ware, ware pieces (not shown) are loaded on the platform C and each of the upper platforms, and are not placed in saggers but are directly exposed to the kiln atmosphere.

Heretofore slabs forming the bottom platform C have ordinarily been made of carborundum, but the slabs E forming the intermediate and upper platforms have been made of fire clay. Fire clay is less refractory and possesses less mechanical strength than carborundum under the conditions of use to which the slabs E are subjected, and the increased strength which the use of carborundum would give the slabs E is desirable and important especially in view of the fact that the posts DD are removed and replaced to load and unload the car, and when replaced are wedged in position under conditions which do not always permit of an equal distribution of the load carried by each slab on its different supporting posts. Heretofore it has been found impossible to use carborundum in the construction of the slabs E because of the surface deterioration which results when a carborundum body is subjected to the temperature and atmospheric conditions prevailing in an enameling kiln. Under the temperatures prevailing in the kiln, there is an interaction between the volatile and alkaline fumes which come from the glaze, and the carborundum grains at the surfaces of the slabs which result in the formation of blisters. After a short period of use, portions of these blisters break off, and when such blister portions fall on the ware beneath, the surface of the ware is spoiled, and the ware then has to be cleaned, redipped and refired.

In the form of the present invention illustrated in Fig. 4, the outer side edge portion $e$ of each slab E is formed of carborundum, while the body portion of the slab is formed of fire clay. The carborundum and fire clay unite to form a strong and intimate joint, whether the slab is formed by a plastic process, or by ramming relatively dry fire clay and carborundum in a mold, or by casting. The strip $e$, which may be a couple of inches in width, or wider, very greatly increases the mechanical strength of the slab under the conditions of use, and markedly decreases its tendency to sag or crack, especially as it is the outer side edge of the slab which has the greatest tendency to fail as a result of the repeated removals and replacements of the posts DD, and the fact that when these posts are replaced they are not always positioned with sufficient accuracy to prevent them from taking more or less than their proper share of the weight of the slab above and the load carried by the latter. While the surfaces of the strips $e$ are subject to deterioration as the result of interaction between glaze fumes and carborundum, the subsequently dropping blister parts do not fall upon and spoil the ware if the latter is arranged as is usual and as needs to be with the slab construction described so that it does not extend beneath the strips $e$.

It will be understood, of course, that the location and form of the strip portions $e$ of fire clay slabs or the like will depend upon the condition of use and that the amount of carborundum or other special refractory material used in the slabs may be varied as conditions make desirable. Instead of a composite body formed as shown in Fig. 4, a slab composed of superposed layers of different materials may advantageously be employed in some cases. For example, as shown in Fig. 5, a slab EA, suitable for the same use as the slabs E, is formed of a bottom layer $e'$ of fire clay, and an upper layer $e^2$ of carborundum. While the upper surface of the carborundum layer $e^2$ blisters as a result of the interaction of glaze fumes and the carborundum, such blistering is not particularly objectionable when occurring at the upper side of the work supporting platform, since there is nothing to carry blister particles into contact with the ware above the platform.

In Fig. 6 another modification is illustrated in which the slab EB shown comprises a layer $e^3$ forming a sort of a core in a body of fire clay. Characteristic advantages of a composite body formed of fire clay and carborundum or other refractory material having properties desirably supplementing those of fire clay may be obtained under some conditions of use with a construction differing from that shown in Fig. 6, for example, in that the core $e^3$ is formed of fire clay and the surrounding portion of the slab is formed of carborundum.

Having now described my invention, what I claim as new and desire to secure by Letters Patent is:

1. A composite refractory body comprising directly integrally connected sections, one of fire clay and another of a material more refractory than fire clay.

2. A composite refractory body composed of a fire clay section and a carborundum section integrally united to the fire clay section.

3. A composite refractory body having an exposed portion of fire clay, and another portion of refractory material less resistant to the surface deteriorating effect of the fumes of glaze forming materials directly connected to said fire clay portion.

4. A kiln car platform slab comprising a body portion of fire clay and an edge portion of stronger refractory material.

Signed at New Castle, in the county of Lawrence, and State of Pennsylvania, this 14th day of December, A. D. 1925.

GEORGE D. MORRIS.